(12) United States Patent
Petitjean et al.

(10) Patent No.: US 8,317,400 B2
(45) Date of Patent: Nov. 27, 2012

(54) HIGH PERFORMANCE THRUST BEARING PAD

(75) Inventors: Dominique Petitjean, Thaon les Vosges (FR); Guillaurne Dupont, Villers sur marne (FR); Anthony Ruquart, Epinal (FR); Philippe Arnold, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 1112 days.

(21) Appl. No.: 12/208,494

(22) Filed: Sep. 11, 2008

(65) Prior Publication Data

US 2010/0061668 A1   Mar. 11, 2010

(51) Int. Cl.
 *F16C 27/02* (2006.01)
 *F16C 33/02* (2006.01)
 *F16C 17/00* (2006.01)

(52) U.S. Cl. .......... 384/99; 384/284; 384/286; 384/322; 29/898.041

(58) Field of Classification Search ............... 384/99, 384/100, 105, 107, 112, 113, 115, 121, 123, 384/305, 322, 420, 284–287; 415/104–105, 415/111, 229; 417/365, 407; 29/898.041
See application file for complete search history.

(56) References Cited

U.S. PATENT DOCUMENTS

| | | | |
|---|---|---|---|
| 3,197,264 A | 7/1965 | Hill | |
| 4,863,291 A * | 9/1989 | Heshmat et al. | 384/305 |
| 5,183,340 A | 2/1993 | Higginbotham et al. | |
| 5,274,289 A | 12/1993 | Wrobel | |
| 5,393,145 A | 2/1995 | Ide | |
| 5,529,399 A * | 6/1996 | Holze | 384/107 |
| 6,017,184 A * | 1/2000 | Aguilar et al. | 415/112 |
| 6,045,266 A * | 4/2000 | Mitsubori et al. | 384/123 |
| 6,709,160 B1 | 3/2004 | Ward et al. | |
| 7,670,056 B2 * | 3/2010 | Petitjean et al. | 384/322 |
| 2007/0003175 A1 * | 1/2007 | Petitjean et al. | 384/322 |
| 2008/0232729 A1 * | 9/2008 | Petitjean et al. | 384/284 |

FOREIGN PATENT DOCUMENTS

| | | |
|---|---|---|
| DE | 1242060 | 3/1959 |
| DE | 102008000536 A1 * | 9/2009 |
| EP | 0329193 | 10/1986 |
| EP | 840027 A2 * | 5/1998 |
| EP | 1972759 A2 * | 9/2008 |
| GB | 1121271 | 7/1968 |
| JP | 2002038966 A * | 2/2002 |
| WO | WO 9907982 A1 * | 2/1999 |
| WO | WO 2004018843 A2 * | 3/2004 |

OTHER PUBLICATIONS

EP Search Report—Honeywell International, Inc.

* cited by examiner

*Primary Examiner* — Marcus Charles
(74) *Attorney, Agent, or Firm* — Brian Pangrie

(57) ABSTRACT

An exemplary bearing for a turbocharger includes one or more thrust pads where each thrust pad includes a portion of a conical well; and a through-bore that includes lubricant channels, each channel configured to direct lubricant from the bore to a corresponding conical well of a thrust pad. Other exemplary technologies are also disclosed.

20 Claims, 9 Drawing Sheets

Exemplary Bearing
300

HIGH PERFORMANCE THRUST BEARING PAD

FIELD OF THE INVENTION

Subject matter disclosed herein relates generally to bearings for turbochargers and, in particular, to bearings that include one or more thrust pads.

SUMMARY

A bearing for a turbocharger can include one or more thrust pads where each thrust pad includes a portion of a conical well; and a through-bore that includes lubricant channels, each channel configured to direct lubricant from the bore to a corresponding conical well of a thrust pad. Other technologies are also disclosed.

BACKGROUND

Exhaust gas driven turbochargers include a rotating shaft carrying a turbine wheel and a compressor wheel, which is rotatably supported within a center housing by one or more lubricated bearings (e.g., oil lubricated). During operation, exhaust gas from an internal combustion engine drives a turbocharger's turbine wheel, which, in turn, drives the compressor wheel to boost charge air to the internal combustion engine. Through proper bearing lubrication, a turbocharger's rotating assembly can readily withstand rotational speeds in excess of 100,000 rpm.

As operational conditions change, a turbocharger can experience significant forces. For example, a sudden increase in exhaust flow can generate so-called "thrust forces". To help transfer and diminish the detrimental impact of thrust forces, clearances between various components allow for formation of protective lubricant layers. For example, bearings, which are inherently affected by thrust forces, typically include end features referred to as "thrust pads" that cooperate with lubricant to transfer axial thrust forces.

A conventional bearing typically includes asymmetric thrust pads where the asymmetry arises from differences between turbine end features and the compressor end features. Such asymmetry introduces variation (e.g., in fabrication techniques) and can require special markings to ensure proper assembly of center housing components.

Another bearing thrust pad issue pertains to lubricant leakage and, more generally, lubricant flow patterns. For example, a conventional thrust pad can allow lubricant to leak from a shaft journal to a center housing drainage well in a manner that by-passes a thrust pad surface. In this example, the lubricant does not contribute to the bearing's thrust load capacity. To ensure adequate load capacity, such a system may require increased lubricant flow, which, in turn, increases power loss (e.g., parasitic power loss, etc.).

Various exemplary technologies described herein pertain to bearing thrust pads, which can address thrust pad issues by promoting beneficial lubricant flow patterns.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers. Turbochargers are frequently utilized to increase the output of an internal combustion engine. A turbocharger generally acts to extract energy from the exhaust gas and to provide energy to intake air, which may be combined with fuel to form combustion gas.

An exemplary thrust pad includes features that can be used on a compressor end and on a turbine end to optimize lubricant flow and, correspondingly, performance (e.g., load capacity, power loss, etc.). An exemplary bearing, that includes such thrust pad features, may be symmetrical or asymmetrical; noting that a bearing with symmetrical end features can facilitate manufacture and assembly.

In various examples, a thrust pad includes at least a portion of a conical well where lubricant enters the well at or near an apex. As explained herein, such a well may be fabricated using a drill bit or a stamp. In operation, lubricant can flow outwardly from an apex of a conical well and to a peripheral land or lands. Such a flow pattern can increase thrust load capacity of a bearing. Further, a bearing with thrust pad conical well features can reduce power loss, when compared to a conventional bearing.

As discussed herein, the term "conical well" can refer to a full conical well or a portion of a conical well (e.g., a conical well section). As shown in various examples, a bore wall of a bearing defines a negative portion of a conical well while a positive portion of the conical well allows for lubricant to flow from the bore to one or more upper lands. While various examples show portions of conical wells, as explained below, depending on the radius of a well and position of its apex, an end of a bearing may include a full conical well (e.g., where the apex of a conical well is offset from the bore wall by a distance of at least the radius of the conical well). A thrust pad may be defined by a conical well (or section thereof) and an adjacent upper land or lands (e.g., at the circumference of the conical well or section thereof).

Figure 1:
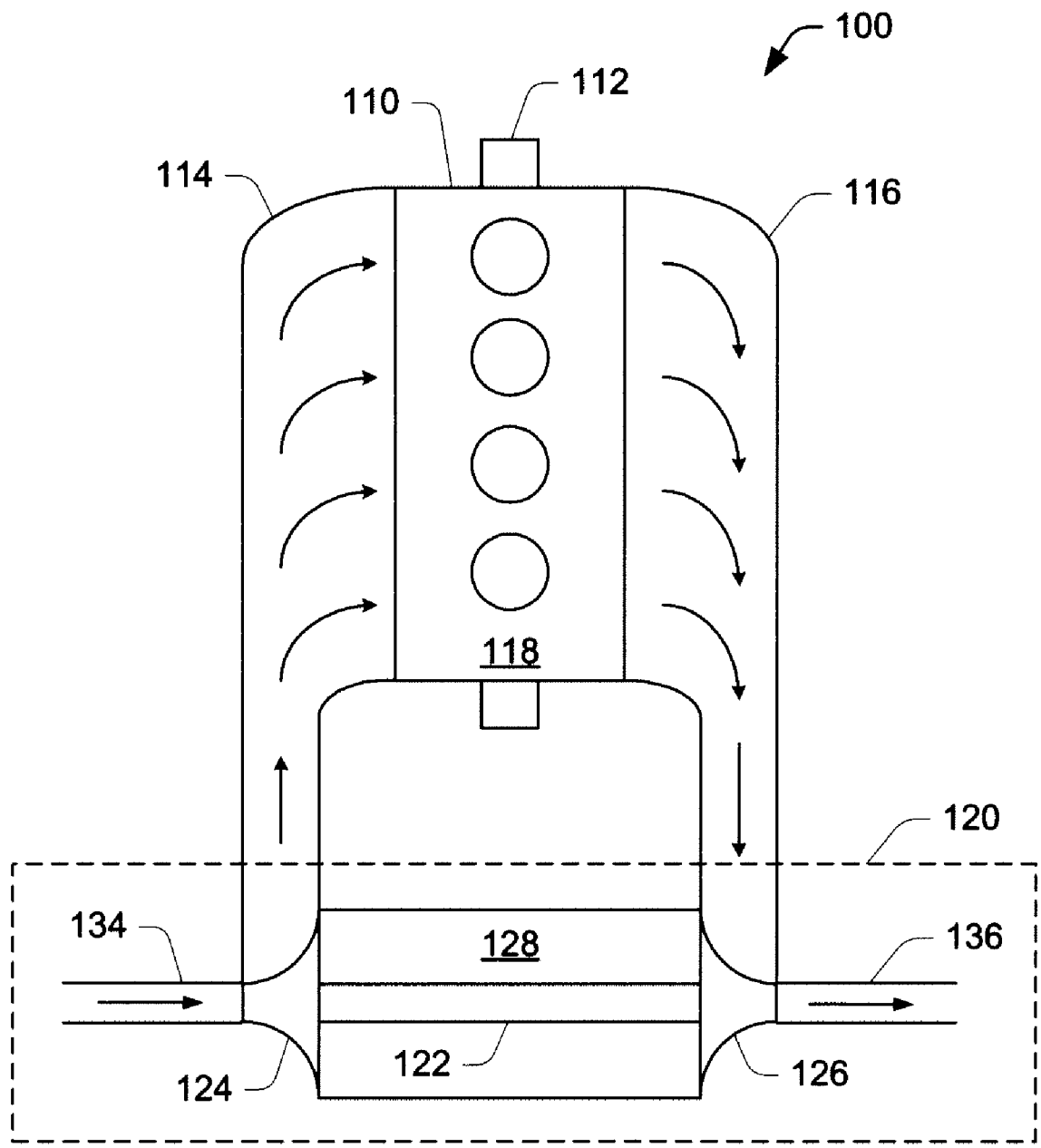
FIG. 1 is a diagram of an internal combustion engine and turbocharger system.

Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
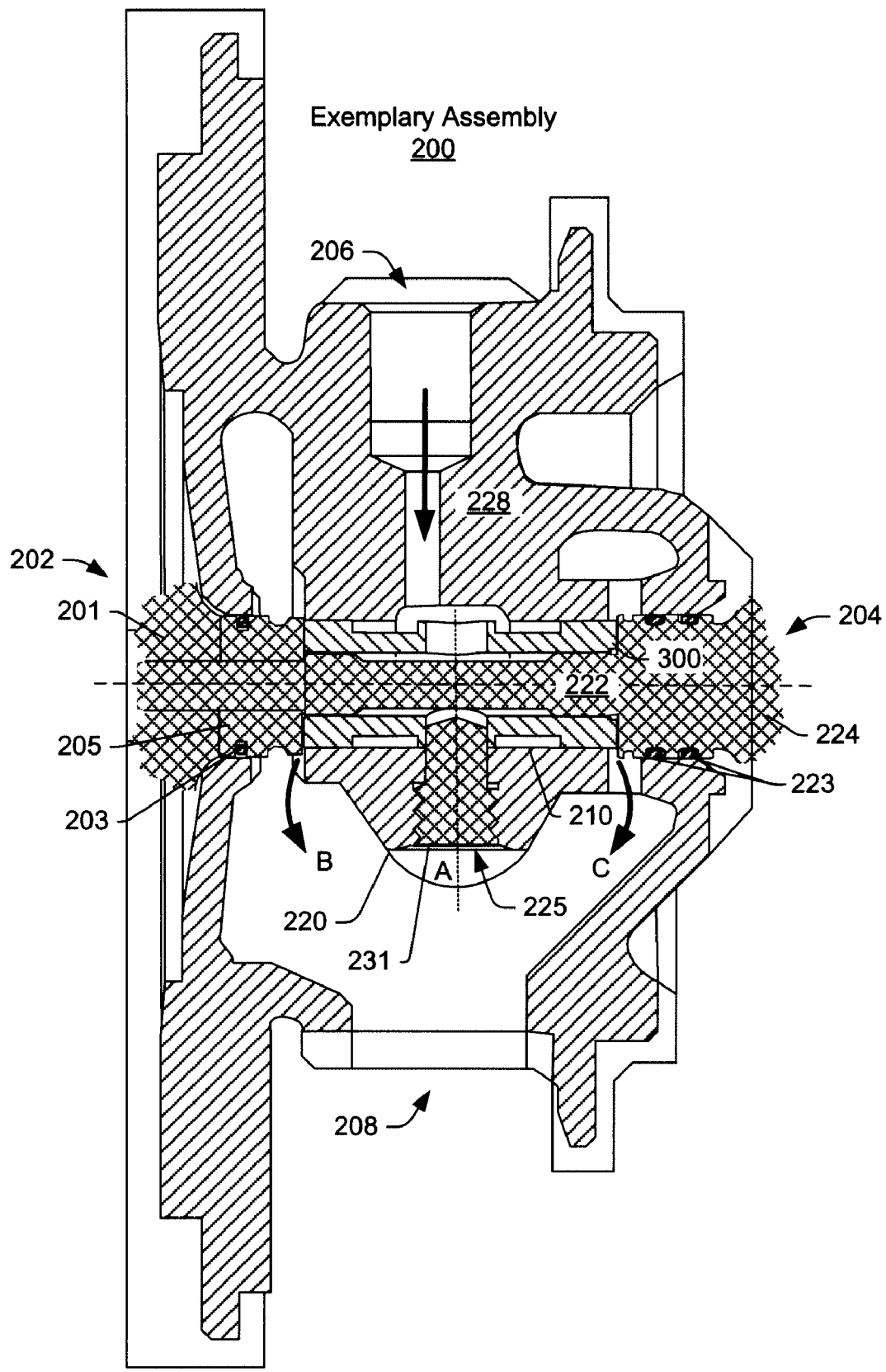
FIG. 2 is a cross-sectional view of an exemplary turbocharger center housing assembly suitable for use with the system of FIG. 1.

FIG. 2 shows an exemplary housing assembly 200 that includes a housing 228 having a compressor end 202 and a turbine end 204. In this example, the housing 228 is a center housing of a turbocharger assembly such as the housing 128 of FIG. 1. The housing 228 houses an exemplary bearing 300, which is described in more detail below.

The turbine wheel 224 and the shaft 222 may be a single component, for example, manufactured by welding a turbine to a shaft. Whether a single component or multi-component configuration is used, one or more sealing mechanisms exist to reduce leakage of lubricant from the bearing space to the turbine wheel space. For example, the turbine wheel 224 includes a pair of axially spaced grooves where each groove seats a seal ring 223. In the example of FIG. 2, the compressor wheel 201 is spaced axially from the bearing 300 by a spacer 205, which includes a groove that seats a seal ring 203. Such a seal mechanism reduces leakage of lubricant toward the compressor wheel 201.

The housing 228 includes a bearing bore 210 for the exemplary bearing 300 and a locating mechanism that includes a boss 220 with an aperture 225 for receiving a locating pin 231 that extends into the bearing bore 210. In such a manner, the exemplary bearing 300 can be constrained from rotating and translating in the bearing bore 210 of the center housing 228. In general, once arranged in conjunction with the housing 228, the bearing 300 is semi-floating and has, to some extent, freedom of movement from end to end and within a clearance between the bearing 300 and the bore 210. While the exemplary bearing 300 includes features that may, at first, appear to limit such movement, attention to desired clearances and locating mechanism(s) can provide for some end to end movement while maintaining some clearance for radial lubricant flow between the bearing 300 and the housing 228 at the compressor end 202 of the assembly or at the turbine end 204 of the assembly. In FIG. 2, some clearance may exist between the locating pin 231 and the bearing 300.

Various features of the exemplary bearing 300 pertain to lubricant flow. In the example of FIG. 2, lubricant for the bearing 300 is supplied at an inlet pressure (e.g., depending on engine speed, etc.) through an inlet 206 of the housing 228 and lubricant may exit the housing 228 via an exit 208. More specifically, lubricant may flow via three lubricant flow paths A, B, C to the exit 208 of the housing 200. Path A is via a locating pin aperture 225, which in the example of FIG. 2 is blocked by use of a solid locating pin 231. Paths B and C are via film ends where an inner lubricant film exists between the shaft 222 and the bore surfaces of the bearing 300 and the outer surfaces of the bearing 300 and an outer lubricant film exists between the bore 210 and the outer surfaces of the bearing 300. The shaft 222, which extends through the bore of the bearing 300 may include a relieved portion that promotes lubricant flow between the shaft 222 and the bearing 300. The shaft 222 may be a single piece or a multi-piece shaft. While FIG. 2 shows the bearing 300 as a unitary bearing, an exemplary bearing may be a multi-piece bearing.

As already mentioned, paths B and C pertain to flow via film ends. However, features of the bearing 300 alter flow at the turbine end and the compressor end. More specifically, the bearing 300 includes a thrust pads at the compressor end and at the turbine end. Such features are shown in more detail in FIG. 3.

Figure 3:
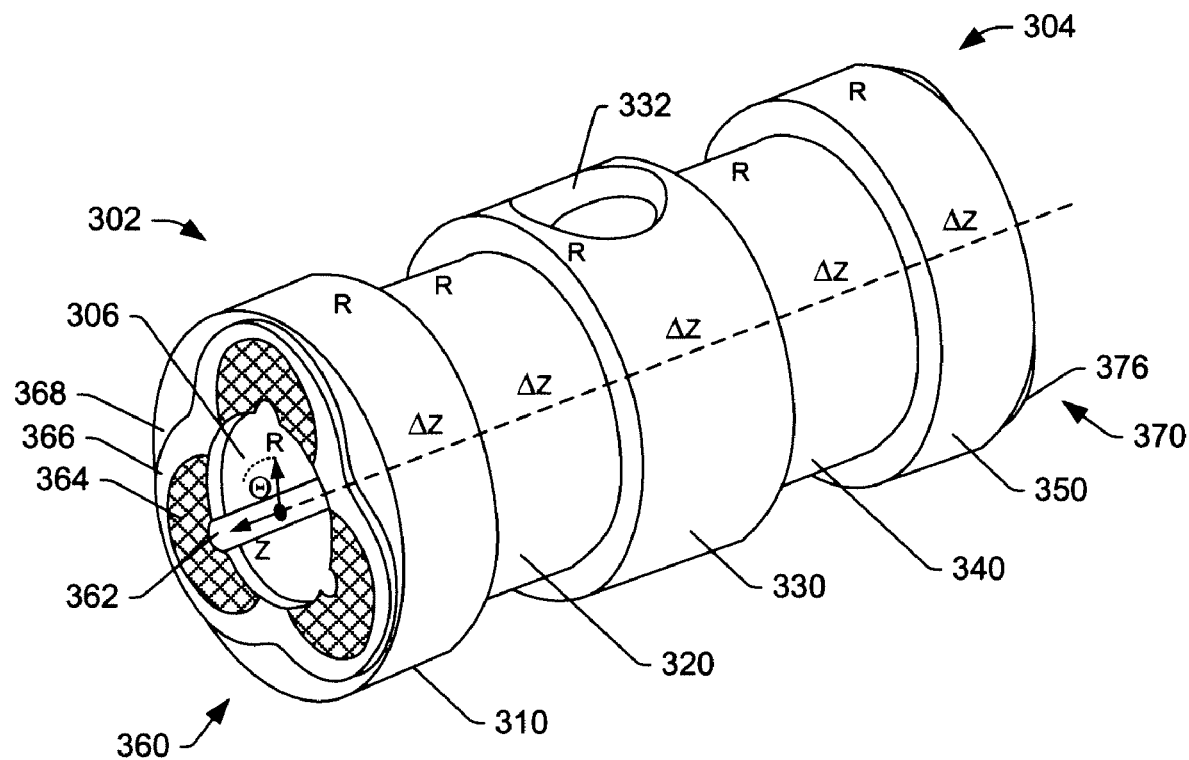
FIG. 3 is a perspective view of a bearing that includes exemplary thrust pad features, the bearing suitable for use with the center housing assembly of FIG. 2.

FIG. 3 shows the exemplary bearing 300 of FIG. 2 along with a cylindrical coordinate system with a radial coordinate (r), an axial coordinate (z) and an azimuthal coordinate (e). The bearing 300 includes a compressor end 302 and a turbine end 304, which may be symmetric or asymmetric. A bore 306 is centered along the z-axis with a bore radius and one or more bore channels 362 to facilitate lubricant flow.

In the example of FIG. 3, the bearing 300 includes various sections 310, 320, 330, 340 and 350, each being described by an axial dimension ($\Delta z$) and a radial dimension (r), the radial dimension being characteristic of an outer radius of a section. As shown in FIG. 2, the bearing 300 includes an opening 332 in the section 330 and a corresponding, opposing opening (not shown in FIG. 3). For a bearing with a symmetric section 330, either of such openings may be suitable for receipt of a portion of the pin 231.

The bearing 300 includes compressor end 302 thrust pad features 360 and turbine end 304 thrust pad features 370, which may be the same or different. The features 360 include three identical thrust pad wells disposed at 120° angles about the z-axis of the bearing. As shown in FIG. 3, a conical well 364 with an apex that coincides with the channel 362, which can act as a lubricant feed for the well 364. At the periphery of the well 364 lies an "upper" land 366, which is further bound by a "downward" step to another, "lower" land 368. Hence, lubricant may flow from the channel 362, to the well 364, to the upper land 366 and then to the lower land 368. The terms "upper", "lower" and "downward" correspond to the z coordinate with increasing "z" dimension being from the bore 306 outward. In the example of FIG. 3, the upper land 366 is contiguous and surrounds the circumferential boundaries of the three conical wells. In other examples, a conical well may be bordered by multiple lands; noting that the example of FIG. 3 is a preferred arrangement.

Figure 4:
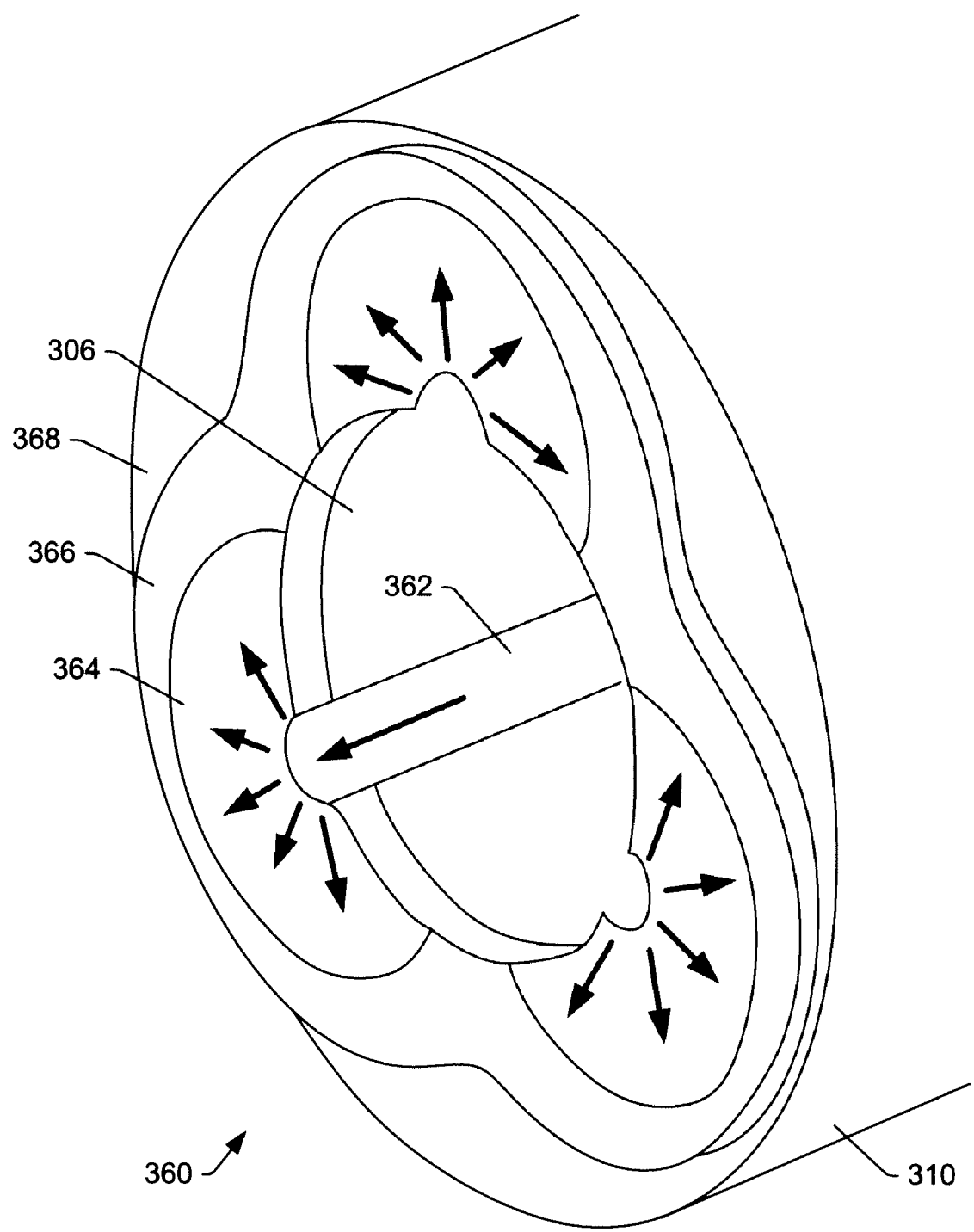
FIG. 4 is a perspective view of the bearing end with thrust pad features of the bearing of FIG. 3.

FIG. 4 shows an enlarged perspective view of the thrust pad features 360 of FIG. 3 along with arrows to indicate approximate directions of lubricant flow. As shown in FIG. 4, lubricant flows from a channel in the bore (e.g., at or near the apex of a well) to a respective well and then generally outwardly in a well from the apex to the circumference. At the circumference, lubricant then flows to the contiguous land 366 that bounds all of the wells. Such an arrangement distributes lubricant flow in a manner that enhances formation of a substantially uniform lubricant film at the contiguous land 366. Further, each conical well acts to maintain flow a somewhat constant cross-sectional flow velocity as the depth of the conical well diminishes with increasing radius; noting that wall effects are more prominent for the smaller depths at the larger radii (i.e., moving from the apex to the circumference of each conic section).

Figure 5A:
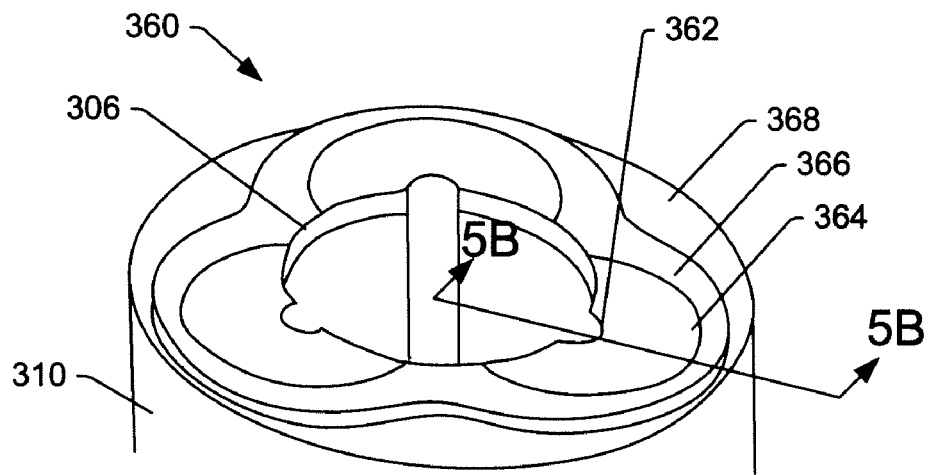
FIG. 5A is a perspective view of the bearing end with thrust pad features of FIGS. 3 and 4 and FIG. 5B is a cross-sectional view of the bearing along a line 5B-5B of FIG. 5A.
Figure 5B:
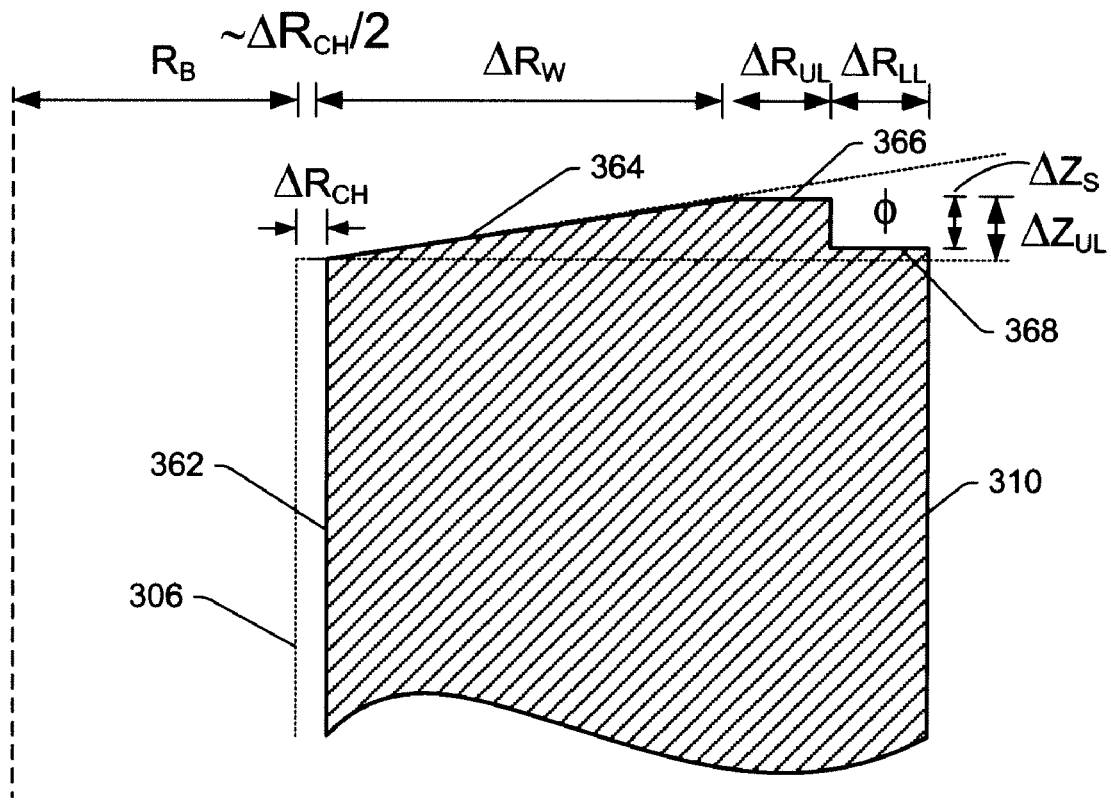

FIG. 5A shows a perspective view of the bearing end 302 with thrust pad features 360 of FIGS. 3 and 4 and FIG. 5B shows a cross-sectional view of the bearing along a line 5B-5B of FIG. 5A. FIG. 5B further shows various dimensions that can be used to describe the exemplary thrust pad features 360.

The bearing section 310 includes the bore 306 with a bore surface disposed at a radius $R_b$ and the channel 362 in the bore has a radial depth of $\Delta R_{ch}$. In this example, the apex of the well 364 is positioned at about the bore radius $R_b$ or at about the bore radius $R_b$ plus one-half the channel depth ($0.5 * \Delta R_{ch}$). The well 364 has a radius of $\Delta R_w$, which is shown as being along the radial line from the axis of the bore 306. At the circumference of the well 364, the upper land 366 has a radial width of $\Delta R_{ul}$ while a step exists that steps downward an axial distance $\Delta Z_s$ to a lower land with a radial width of $\Delta R_{ll}$ along the radial line shown in the cross-section of FIG. 5B. In this example, the lower land is slightly above the lowest axial point of the conical well, which is an axial distance $\Delta Z_{ul}$ from the upper land. The conical well 364 can be further characterized by an angle $\phi$ (e.g., ramp angle). For example, a conical well may include a ramp angle of approximately 0.5° to about 1.5°. Ramp angle for a well may be adjusted depending on factors such as lubricant rheology, load capacity, number of wells, well radius, etc.

Figure 6:
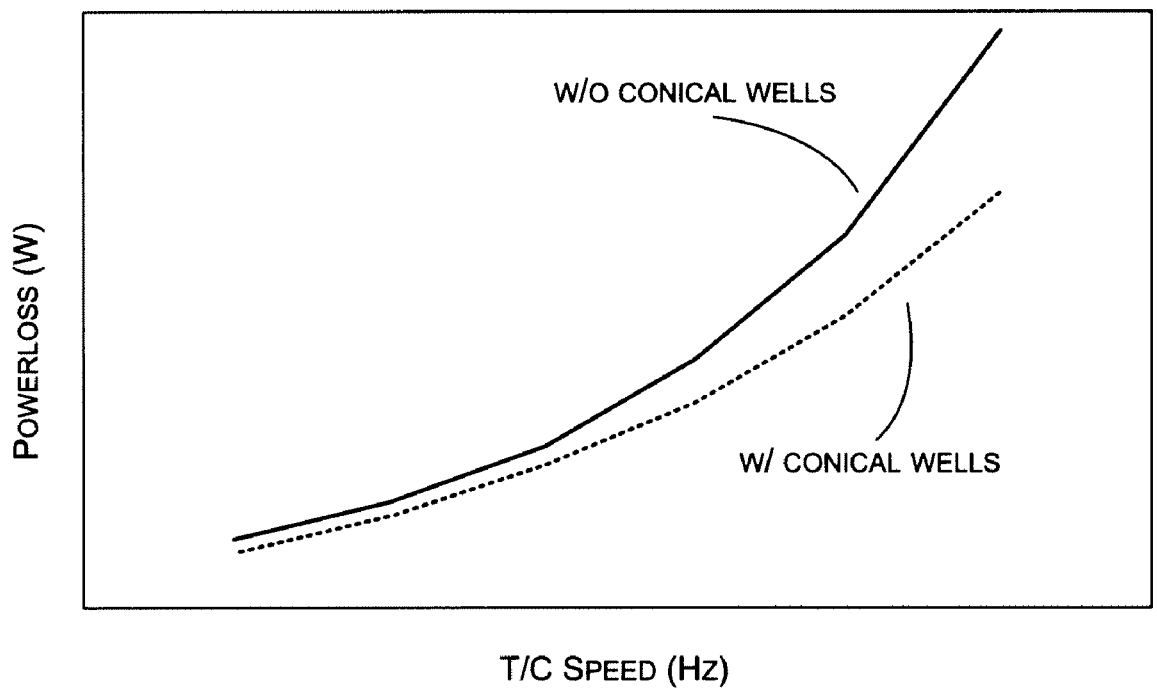
FIG. 6 is a plot of exemplary trial results for a conventional bearing and a bearing with exemplary thrust pad features that demonstrates a decrease in power loss with respect to speed.

FIG. 6 shows an exemplary plot 600 of trial results for a bearing with exemplary thrust pad features and for a bearing without such features. The data indicate that a bearing with conical well features can reduce power loss with respect to speed when compared to a conventional bearing. Various trials for a 3-lobe arrangement (as shown in FIGS. 3, 4 and 5) demonstrated reduced oil flow requirement, better thrust load capacity, limited power loss, better rotor dynamics. Further, such features could be imparted to a blank to form a symmetrical bearing using relatively low cost fabrication techniques (e.g., machining, stamping, etc.).

Figure 7A:
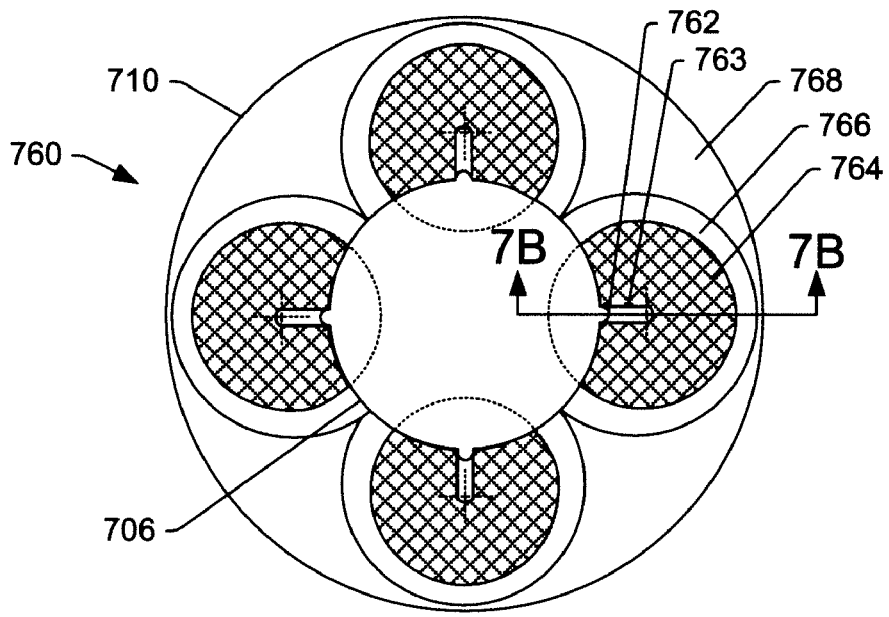
FIG. 7A is an end view of a bearing with thrust pad features and FIG. 7B is a cross-sectional view of the bearing along a line 7B-7B of FIG. 7A.
Figure 7B:
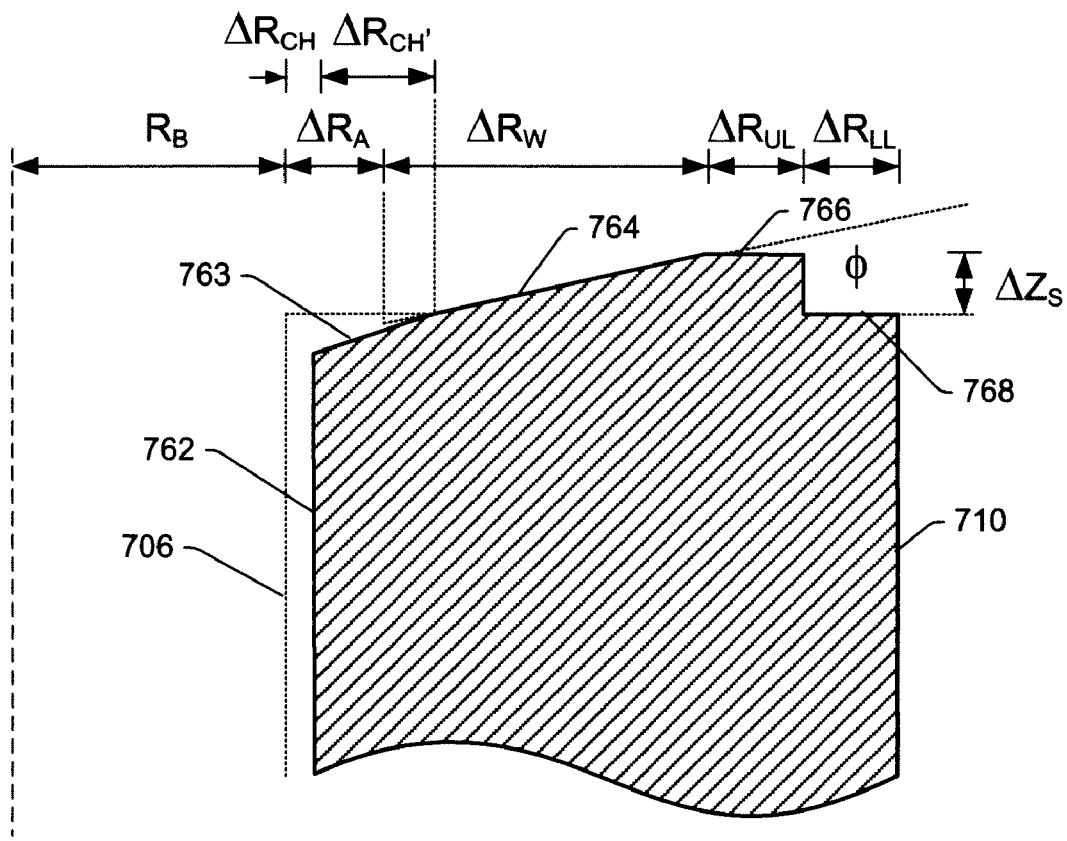

FIG. 7A shows an end view of a bearing with thrust pad features 760 and FIG. 7B shows a cross-sectional view of the bearing along a line 7B-7B of FIG. 7A. FIG. 7B further shows various dimensions that can be used to describe the exemplary thrust pad features 760 of the bearing section 710. This example includes four conical wells and non-contiguous upper lands, i.e., each well 764 is bounded by a respective upper land 766. Further, each channel 762 includes a channel extension 763 that allows the apex of a well 764 to be positioned radially outward from the surface of the bore 706.

As shown in FIG. 7B, the bearing section 710 includes a bore 706 with a bore surface disposed at a radius $R_b$ and a channel 762 in the bore has a radial depth of $\Delta R_{ch}$. In this example, the channel 762 extends radially outward near the end of the bearing by a distance $\Delta R_{ch}'$. This additional feature allows the apex of a conical well 764 to be moved radially away from the bore 706, as indicated by the radial distance $\Delta R_a$. The well 764 has a radius of $\Delta R_w$, which is shown as being along the radial line from the axis of the bore 706. At the circumference of the well 764, an upper land 766 has a radial width of $\Delta R_{ul}$ while a step exists that steps downward an axial distance $\Delta Z_s$ to a lower land with a radial width of $\Delta R_{ll}$ along the radial line shown in the cross-section of FIG. 7B. In this example, the lower land is approximately at the same axial point as the end opening of the bore 706. The conical well 764 can be further characterized by an angle $\phi$ (e.g., ramp angle). For example, a conical well may include a ramp angle of approximately 0.5° to about 1.5°. Ramp angle for a well may be adjusted depending on factors such as lubricant rheology, load capacity, number of wells, well radius, etc.

As described herein, an exemplary bearing for a turbocharger includes at least one end that includes one or more conical wells where each conical well includes a circumference bordered at least in part by an upper land; and a through-bore that includes at least one lubricant channel configured to direct lubricant from the bore to a corresponding one of the one or more conical wells. Such a bearing may include an end with a contiguous upper land and/or an end with non-contiguous upper lands. As shown in various examples, a circumference of a conical well may be bordered by an upper land that descends to a lower land, which may be a contiguous lower land.

An exemplary bearing may include a lubricant channel extension that extends radially outward for flow of lubricant to a corresponding conical well. As mentioned, a conical well may be a portion of a full conical well, for example, a portion defined in part by a bore wall of a through-bore.

Figure 8A:
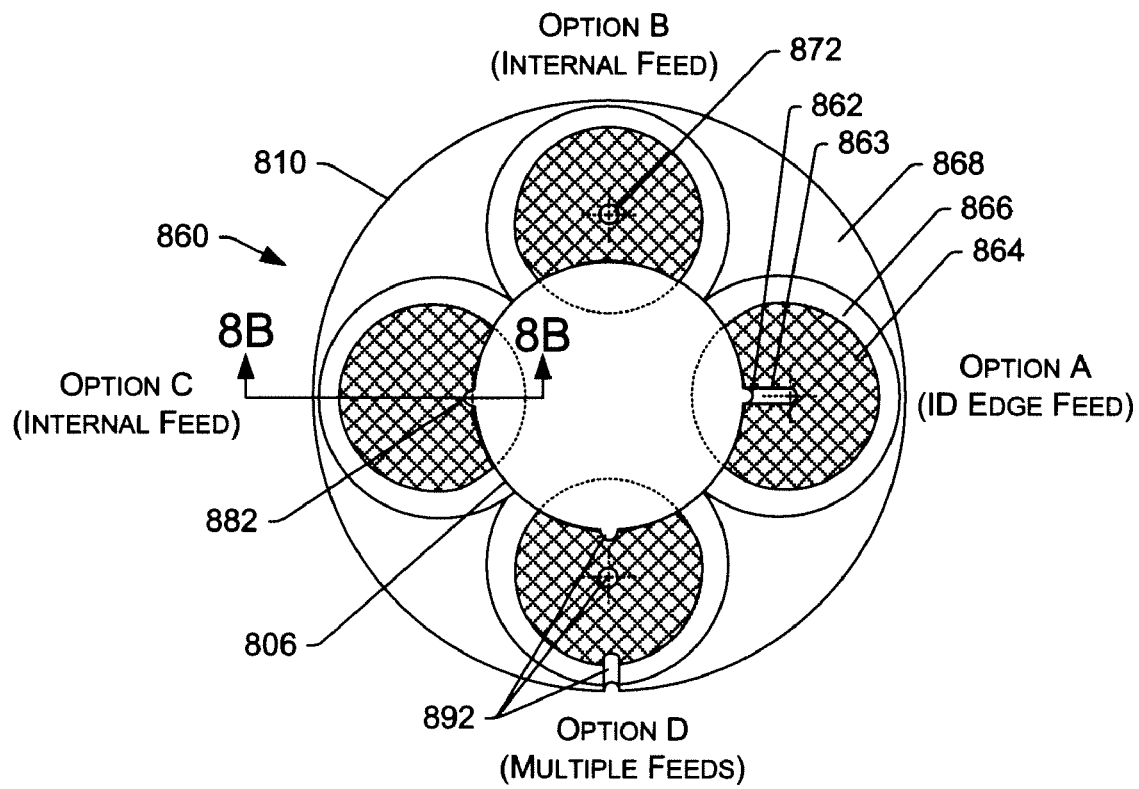
FIG. 8A is an end view of a bearing with thrust pad features for some options as to a lubricant path or paths to a conical well and FIG. 8B is a cross-sectional view of the bearing along a line 8B-8B of FIG. 8A.

FIG. 8A shows a view of exemplary thrust pad features 860 of a bearing section 810 (see, e.g., the section 310 of FIG. 3). The example of FIG. 8 shows options A, B, C and D for configurations of lubricant paths to a conical well. Typically, a bearing would include conical wells with one or more same or similar configurations of lubricant paths (see, e.g., FIG. 3 and FIG. 7). However, a bearing may include any of a variety of configurations of lubricant paths. Thus, a bearing may include one or more of the lubricant path configurations of options A, B, C and D.

The bearing section 810 includes four conical wells and non-contiguous upper lands, i.e., each well 864 is bounded by a respective upper land 866. In option A, referred to as an inner diameter edge feed (i.e., inner diameter of the bearing at the bore 806), a lubricant channel 862 includes a channel extension 863 that defines a lubricant path that may, for example, extend to the apex or other point of a well 864.

In option B, referred to as internal feed, a conical well includes an opening 872 that is fed by an internal path of the bearing section 810. The internal path may originate at the inner diameter (e.g., along the bore 806), at the outer diameter or at some other point or points along a surface of the bearing. In option B, a channel may be drilled from the outer diameter to a point in a conical well to thereby define a lubricant path from the outer diameter to the conical well.

In option C, also referred to as an internal feed, a lubricant channel 882 defines a lubricant path that extends from an outer surface (e.g., along section 810 or other section) of the bearing to a conical well. A particular configuration for option C is explained in a cross-sectional view in FIG. 8B.

In option D, referred to as multiple feeds, a conical well is fed by a lubricant path per option A, a lubricant path per option B and a lubricant path per option D. As described herein, a conical well may include one or more lubricant feeds. In other words, a bearing may include multiple lubricant paths to a conical well. Further, the lubricant paths may be of same or different configurations (e.g., all option B, a mix of options, etc.).

Figure 8B:
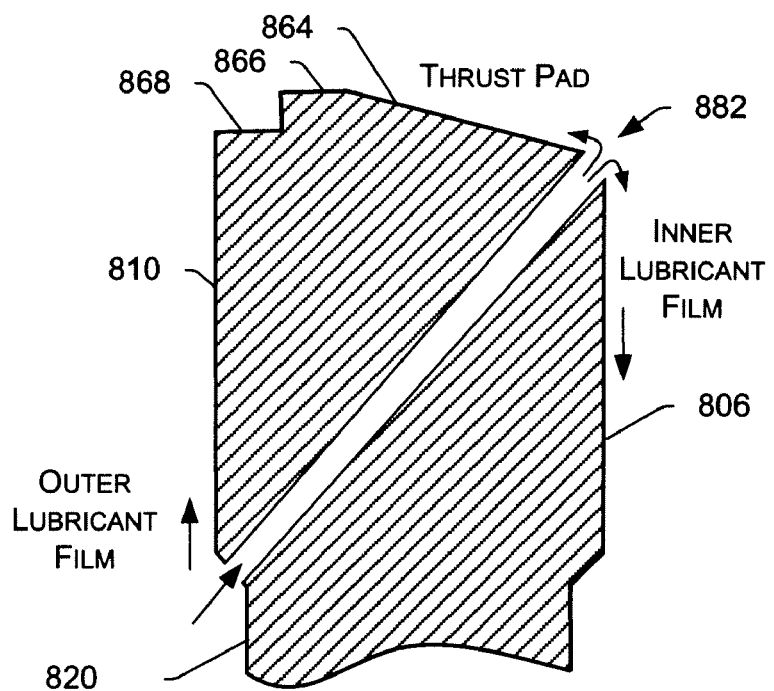

FIG. 8B shows a cross-sectional view of the bearing of FIG. 8A along a line 8B-8B, which pertains to option C. As indicated, a channel 882 extends from an outer surface of the bearing (e.g., at section 810, section 820 or a portion therebetween) to a corner of the bearing at the inner diameter. As indicated, the channel 882 allows for lubricant flow to a thrust pad (i.e., a conical well 864) and to an inner lubricant film along the bore 806.

An exemplary bearing can include thrust pad features that allow for flow of lubricant from a bearing outer diameter (or outer surface) to a conical well (or conical well section) located on an end of the bearing. Such features may include a cylindrical path drilled from the outer diameter of the bearing to a point in the conical well, which may optionally be at or near the inner diameter of the bearing. The flow mechanics of lubricant to the conical well can be determined in part by the drill location on the outer diameter of the bearing, the location in the conical well, lubricant properties, lubricant film characteristics, clearance between the outer diameter and a housing bore, cross-sectional area of the cylindrical path, surface characteristic of the cylindrical path, length of the cylindrical path, etc. Further, as explained with respect to FIG. 8A, multiple lubricant paths may exist to allow for flow of lubricant to a conical well; noting that multiple paths can allow for flow of lubricant to and from a conical well (e.g., depending on pressures, etc.).

An exemplary bearing may include a path that extends from an outer diameter (or outer surface) of the bearing to a conical well and to an inner diameter of the bearing. Such a path can allow for flow of lubricant to the conical well and to the inner diameter (e.g., to form an inner diameter film for shaft lubrication). In the example of FIG. 8B, lubricant that flows to the inner diameter of the bearing may exit the bearing via a locating pin aperture (see, e.g., feature 332 of FIG. 3). Further, such a bearing may lack axial grooves and demonstrate an increased lubricant sealing capacity. While a single path is indicated for the example of FIG. 8B, a bearing may include a path to a thrust pad and a separate or connected path (e.g., a bifurcated path) to an inner diameter.

Various exemplary bearing lubricant path configurations can provide "fresh" lubricant to both radial thrust pads and an inner diameter film (or films). This is in contrast to an approach that feeds lubricant to axial grooves at the inner diameter to allow for lubricant film or films formation where the lubricant film(s) interact with a rotating shaft and become heated. Due to pressure (and/or other forces), the heated lubricant then flows from the inner diameter to an end or ends of the bearing; hence, the lubricant reaching the end(s) of the bearing is not "fresh". As described herein, an exemplary bearing includes one or more lubricant paths that allow lubricant to flow from an outer diameter (or outer surface) of the bearing to a thrust pad (e.g., conical well thrust pad), where the lubricant bypasses a bore of the bearing.

As shown in FIGS. 3, 4 and 5, a bearing may include three conical wells and three channels. In such an example, each of the three conical wells may include an apex coincident with a respective channel. Other examples are also shown in FIGS. 7A, 7B, 8A and 8B. All examples include a conical well (or conical well section). While some examples show a lubricant path that feeds a conical well at an apex of the well, other examples show alternative lubricant paths.

As described herein, an exemplary bearing for a turbocharger includes one or more thrust pads where each thrust pad includes a portion of a conical well; and a through-bore that includes lubricant channels, each channel configured to direct lubricant from the bore to a corresponding conical well of one of the one or more thrust pads. In such an example, a bearing may include one or more compressor end thrust pads and one or more turbine end thrust pads.

As described herein, an exemplary bearing for a turbocharger includes one or more conical wells where each conical well includes a circumference bordered at least in part by an upper land and at least one lubricant channel configured to direct lubricant to at least one of the one or more conical wells. In such an example, a correspondence may exist between the number of lubricant channels and conical wells. In such an example, a lubricant channel may include an opening along an outer diameter of the bearing to provide a direct lubricant path from the outer diameter of the bearing to one of the one or more conical wells (i.e., a path that does not include an inner diameter lubricant film for shaft lubrication). Such an example may include a lubricant path from the outer diameter of the bearing to an inner diameter of the bearing.

Figure 9:
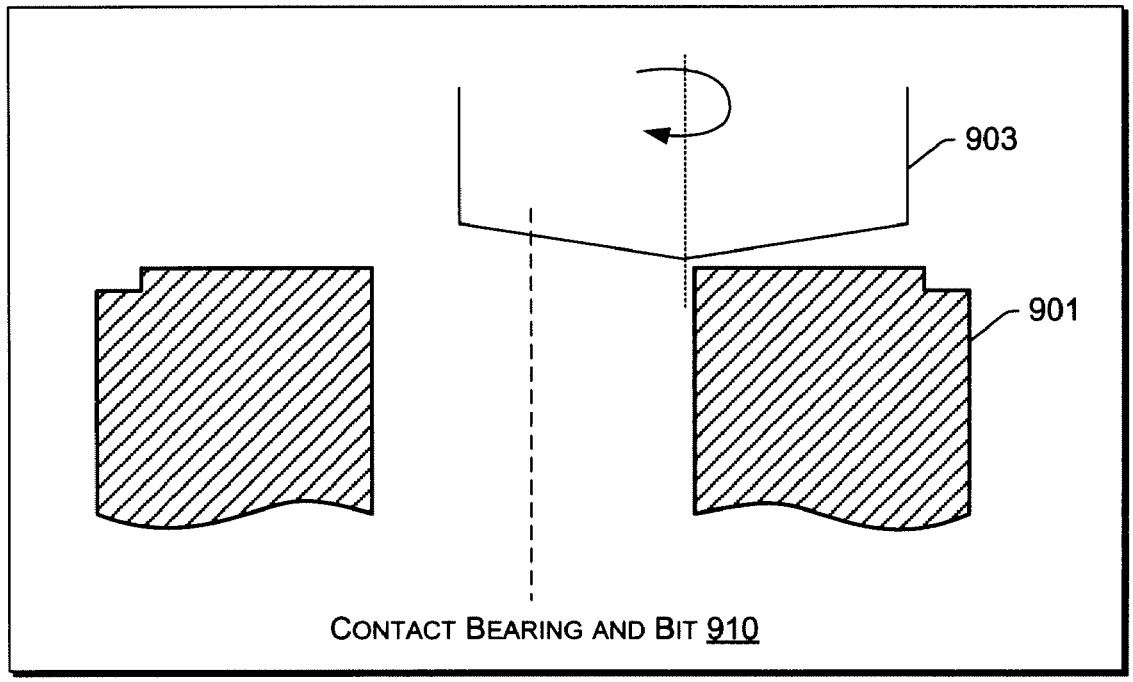
FIG. 9 is a diagram of an exemplary fabrication technique for thrust pad end features.
Figure 9:
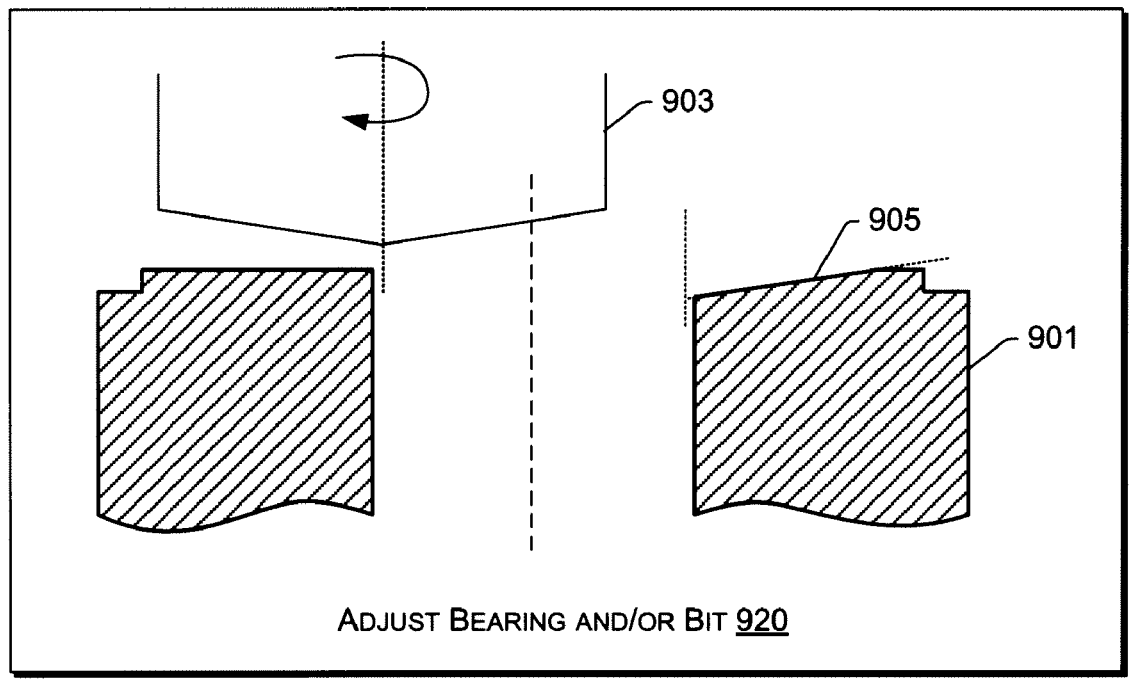

FIG. 9 shows an exemplary fabrication technique 900. The technique 910 includes contacting step 910 that contacts a bearing 901 and a bit 903 to form a conical well 905 and an adjusting step 920 that adjusts the bearing 901 and/or the bit 903 to form another conical well. While this example pertains to a bit, a stamping mechanism may be used where a stamp contacts the end of a bearing to form one or more conical wells. In general, a stamp is applied with sufficient axial force to deform a material to thereby form desired features. For example, a bearing "blank" may be stamped to form one or more conical wells in an end or ends. A stamp configured to perform such an operation can include surface relief for one or more positive conical wells or conical well portions. Hence, a stamp for forming a single conical well may appear similarly to the bit 903 of FIG. 9 (e.g., where the contacting contacts the bearing with sufficient stamping force to form a conical well).

As described herein, an exemplary method of fabricating bearing thrust pad features includes contacting a rotating bit or a stamp and an end of a bearing, the bearing including a bore with lubricant channels; and forming a conical well in the end of the bearing, the conical well configured to direct lubricant, received via one of the lubricant channel, to an upper land positioned at the circumference of the conical well. Such a method may use a bit or a stamp with an axis and include aligning the bit axis or stamp axis with one of the lubricant channels prior to the contacting. In such a method, the bearing may be a turbocharger bearing. While use of a bit and a stamp are described in detail, other techniques may be used (e.g., sintering, casting, etc.).

As described herein, a bearing includes one or more conical well features that act to direct lubricant to a land. Such a bearing may be symmetrical or asymmetrical with respect to such end features; noting that a symmetrical bearing has advantages associated with assembly.

An exemplary bearing with symmetrical three-lobe thrust pad ends provided better stability for a rotor assembly. Such an arrangement also eliminated lubricant leakage between the pads and directed lubricant to upper lands in a manner that essentially eliminated lubricant patterns that bypass upper lands; hence, all lubricant exiting the bore of a bearing could potentially contribute to thrust load capacity. Such an arrangement further reduced power loss by strictly using lubricant necessary for the thrust (lubricant flow is limited by the pad features and also by the axial groove effective area). In terms of manufacturing, various exemplary features are compatible with low cost fabrication techniques such as stamping.

In various trials, the ramp of a conical well for a thrust pad was defined by a conical machining (ramp angle approximately 0.5° up to 1.5°) where the apex was concentric with axial feeding grooves (i.e., axial channels). As the axial grooves typically extend symmetrically along the length of a bearing, such an approach provides for a bearing with symmetrical ends. With respect to a ramp height dimension (see, e.g., FIGS. 5B and 7B), such a dimension may be controlled. In various trials, this height was about 15 µm to about 60 µm.

In various examples, an upper land of a thrust pad was configured to defines an external negative step and thereby set the thrust area. While particular examples show 3 and 4 well arrangements, any number of wells (e.g., from one to ten) may be used. Further, as shown in the example of FIG. 7A, lubricant from an upper land of one pad may readily communicate with a neighboring upper land (e.g., non-contiguous lands), which can help to ensure an optimal running condition. In various examples, axial groove area may be tuned to control lubricant flow to one or more conical wells. Various features and techniques described herein are applicable to a standard Z bearing design and can also be used on most any type of thrust bearing.

As shown in FIG. 3, an efficient thrust pad provides an optimal lubricant flow pattern. Factors such as ramp angle, ramp length, ramp height, etc. can impact efficiency and thrust load capacity and can be controlled for optimal results.

The invention claimed is:

1. A bearing for a turbocharger comprising:
   a compressor end and a turbine end, wherein at least one of the ends comprises one or more conical wells wherein each conical well comprises a circumference bordered at least in part by an upper land that extends outwardly from the circumference to form a lobe-shaped border that descends to a lower land; and
   a through-bore that extends from the compressor end to the turbine end and that comprises at least one lubricant channel configured to direct lubricant from the bore to a corresponding one of the one or more conical wells.

2. The bearing of claim 1 wherein the compressor end comprises one or more of the one or more conical wells.

3. The bearing of claim 1 wherein the turbine end comprises one or more of the one or more conical wells.

4. The bearing of claim 1 wherein the bearing comprises two or more conical wells and wherein the compressor end and the turbine end comprise the two or more conical wells.

5. The bearing of claim 1 wherein the upper land comprises a contiguous upper land.

6. The bearing of claim 1 wherein the upper land comprises a non-contiguous upper land.

7. The bearing of claim 1 wherein the bearing comprises two or more conical wells and at least two lubricant channels, wherein at least one of the ends comprises a number of the two or more conical wells and wherein the bore comprises a corresponding number of the at least two lubricant channels.

8. The bearing of claim 7 wherein each of the two or more conical wells comprises an apex coincident with a respective one of the at least two lubricant channels.

9. The bearing of claim 1 wherein each of the one or more conical wells comprises an apex coincident with a respective one of the at least one lubricant channel.

10. The bearing of claim 1 wherein the compressor end is symmetrical to the turbine end.

11. The bearing of claim 1 wherein the lower land comprises a single contiguous lower land.

12. The bearing of claim 1 wherein at least one of the at least one lubricant channel comprises a channel extension that extends radially outward for flow of lubricant to a corresponding one of the one or more conical wells.

13. The bearing of claim 1 wherein at least one of the at least one conical wells comprises a portion of a full conical well, the portion defined in part by a bore wall of the through-bore.

14. A bearing for a turbocharger comprising:
   one or more thrust pads wherein each thrust pad comprises a portion of a conical well that comprises a circumference bordered at least in part by an upper land that extends outwardly from the circumference to form a lobe-shaped border that descends to a lower land; and
   a through-bore that comprises lubricant channels, each channel configured to direct lubricant from the bore to a corresponding conical well of one of the one or more thrust pads.

15. The bearing of claim 14 comprising one or more compressor end thrust pads and one or more turbine end thrust pads.

16. A method of fabricating a turbocharger bearing thrust pad features, the method comprising:
   contacting a rotating bit or a stamp and an end of a bearing, the bearing comprising a bore that comprises lubricant channels; and
   forming a conical well in the end of the bearing, the conical well configured to direct lubricant, received via at least one of the lubricant channels, to an upper land positioned at the circumference of the conical well wherein the upper land extends outwardly from the circumference to form a lobe-shaped border that descends to a lower land.

17. The method of claim 16 wherein the bit or the stamp comprises an axis and further comprising aligning the bit axis or the stamp axis with one of the lubricant channels prior to the contacting.

18. A bearing for a turbocharger comprising:
   at least one end that comprises one or more conical wells wherein each conical well comprises a circumference bordered at least in part by an upper land that extends outwardly from the circumference to form a lobe-shaped border that descends to a lower land; and
   at least one lubricant channel configured to direct lubricant to a corresponding one of the one or more conical wells.

19. The bearing of claim 18 wherein the at least one lubricant channel comprises an opening along an outer diameter of the bearing to provide a direct lubricant path from the outer diameter of the bearing to one of the one or more conical wells.

20. The bearing of claim 19 further comprising a lubricant path from the outer diameter of the bearing to an inner diameter of the bearing.

* * * * *